Sept. 15, 1970    L. G. RICH    3,529,084
LINE FOLLOWER

Filed April 17, 1967    6 Sheets-Sheet 1

INVENTOR.
LEONARD G. RICH
BY
McCormick, Paulding & Huber
ATTORNEYS

Sept. 15, 1970  L. G. RICH  3,529,084
LINE FOLLOWER
Filed April 17, 1967  6 Sheets-Sheet 2

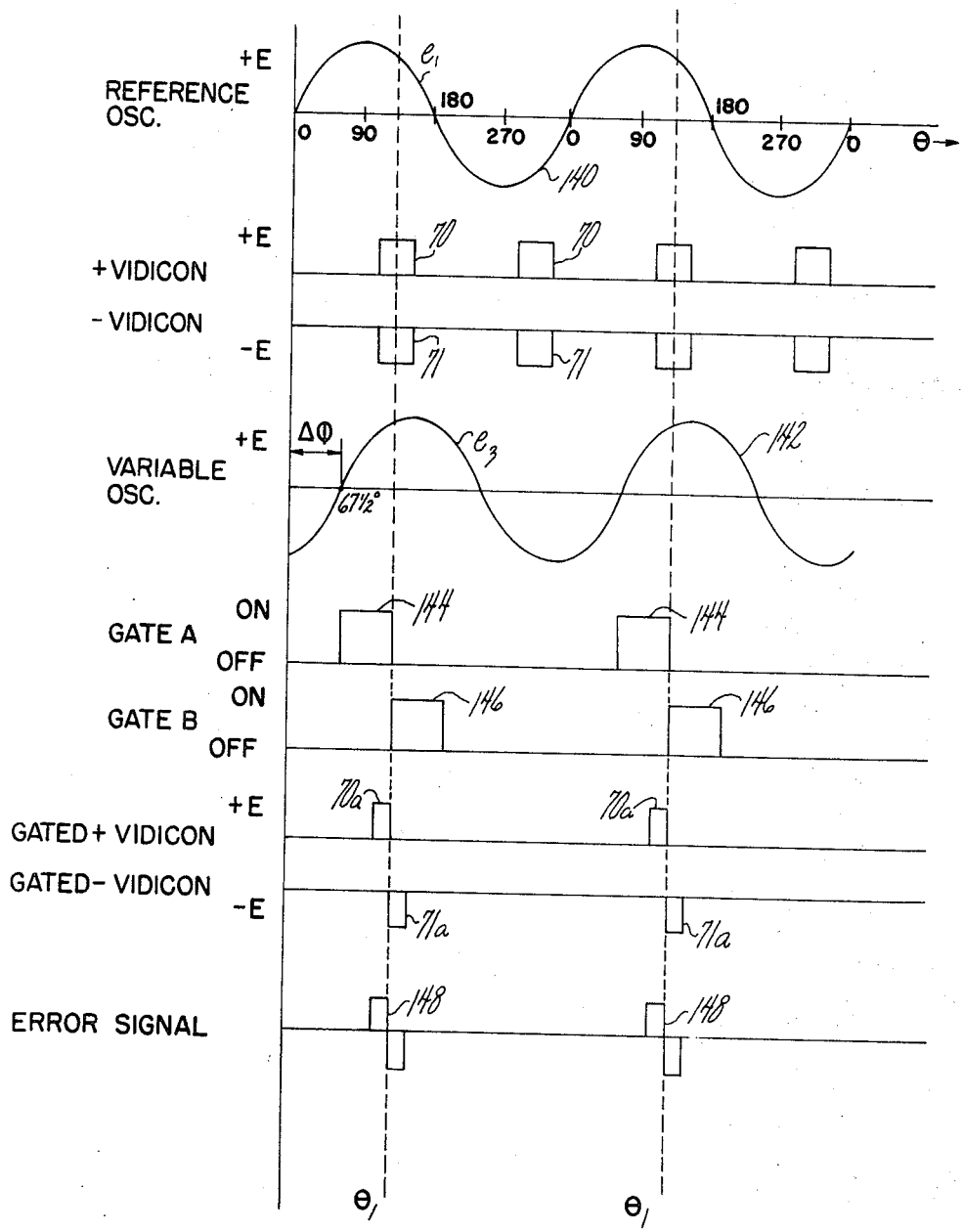

Sept. 15, 1970      L. G. RICH      3,529,084
LINE FOLLOWER
Filed April 17, 1967      6 Sheets-Sheet 4
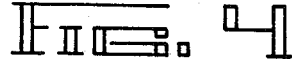
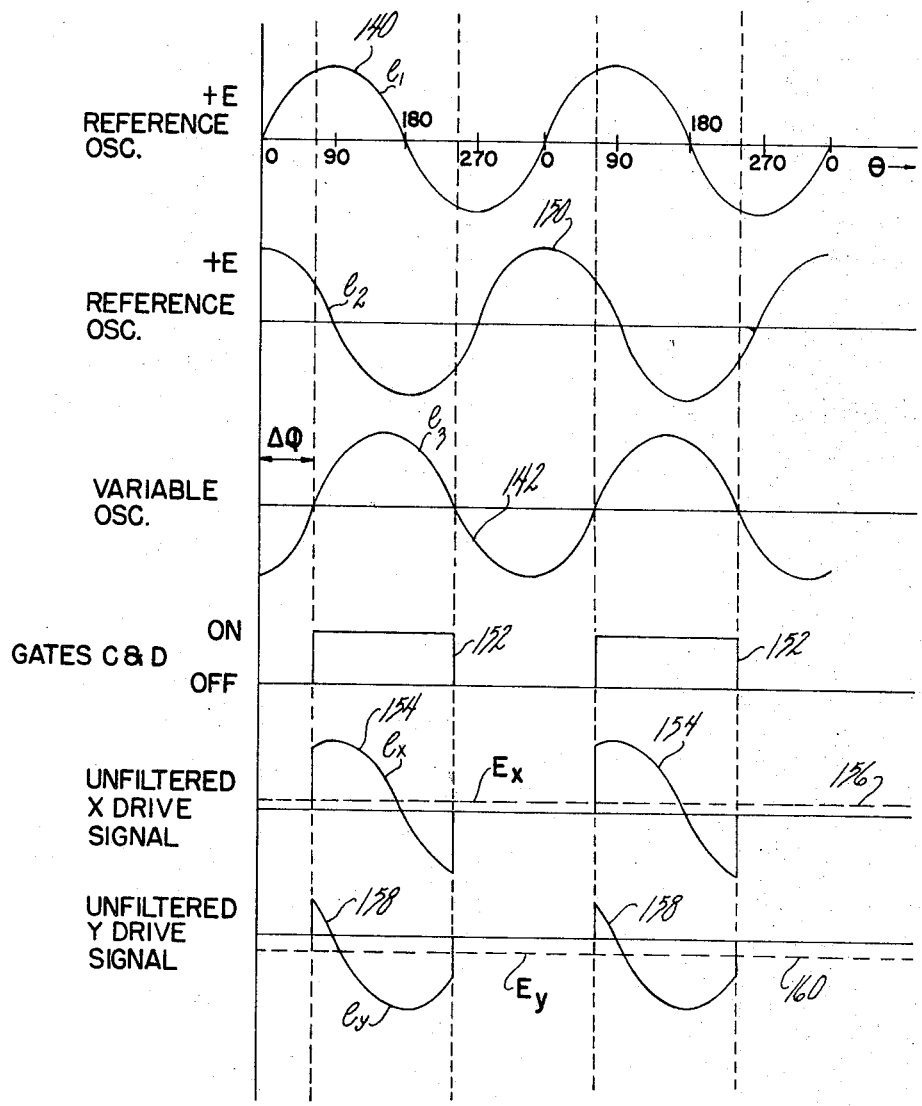

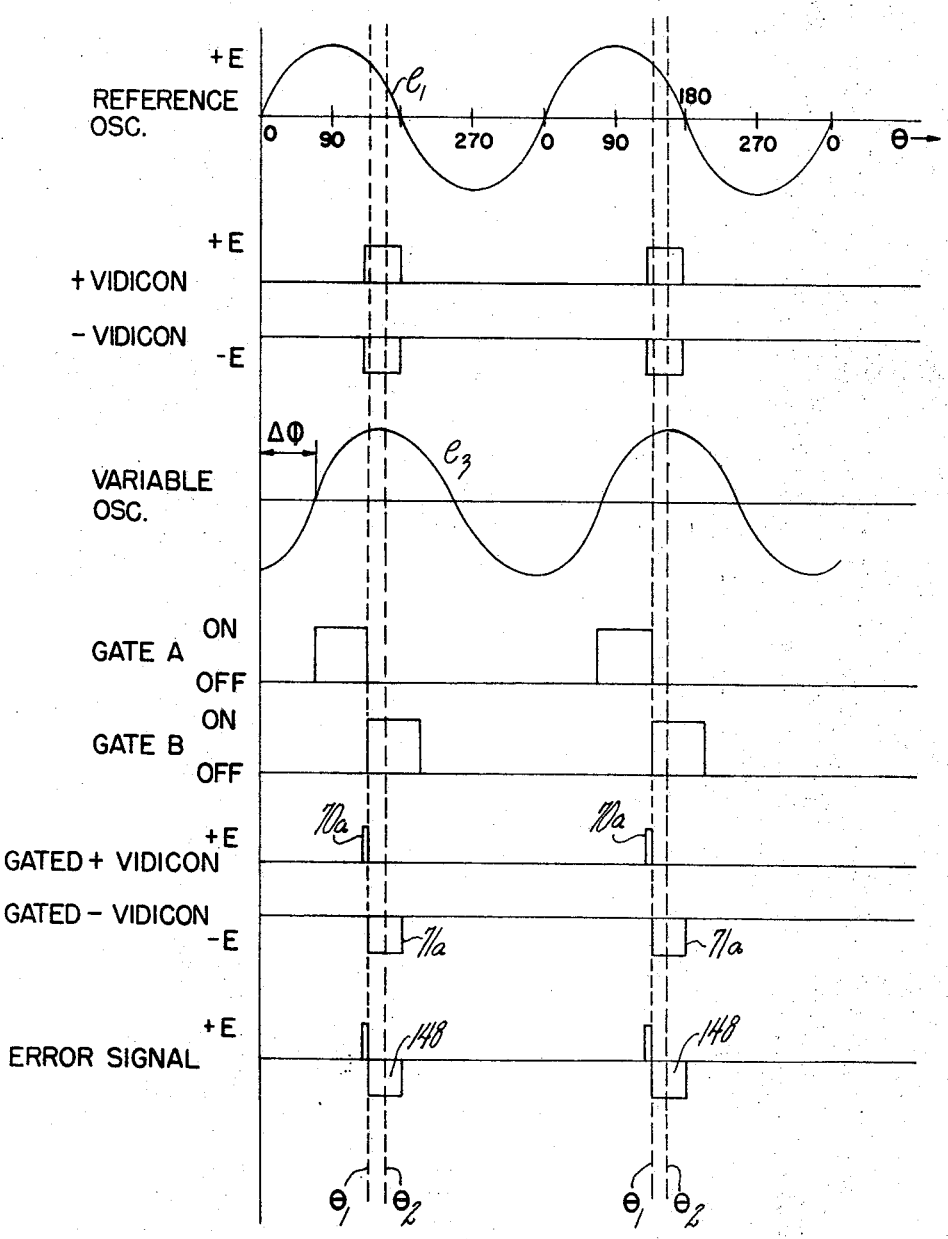

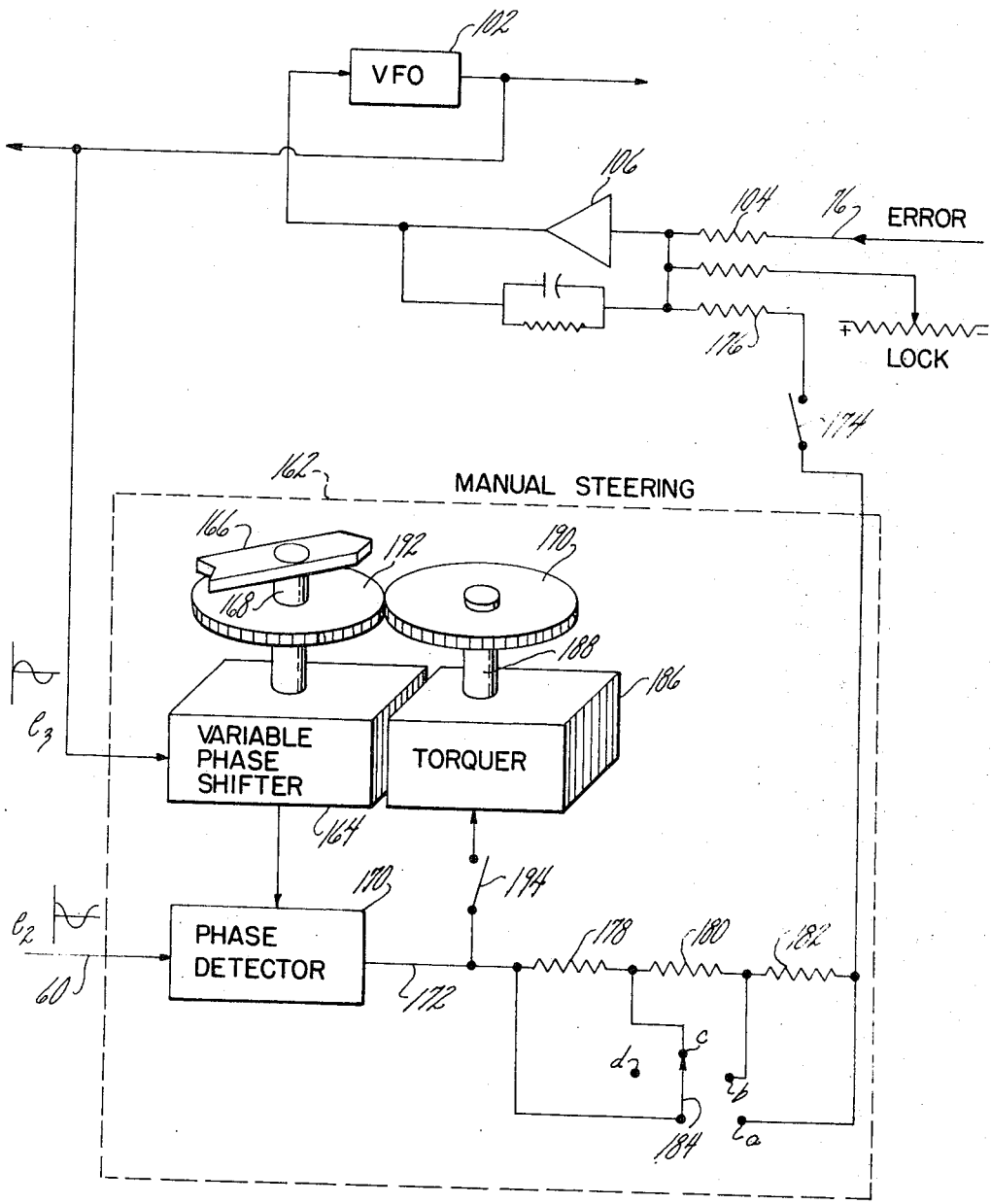

United States Patent Office 3,529,084
Patented Sept. 15, 1970

1

3,529,084
LINE FOLLOWER
Leonard G. Rich, West Hartford, Conn., assignor to The Gerber Scientific Instrument Company, South Windsor, Conn., a corporation of Connecticut
Filed Apr. 17, 1967, Ser. No. 631,249
Int. Cl. H04n 3/30
U.S. Cl. 178—6.8       16 Claims

ABSTRACT OF THE DISCLOSURE

A device is provided for automatically following a line existing on a sheet of paper, pattern or the like. The line may be drawn or otherwise present on the surface of the material or may be an edge of the material. The line is optically scanned by a scanner having a circular scan path. A given angular portion of the scan circle represents an "aperture" which is shifted angularly to maintain the line centered therein and the angular position of the aperture in turn controls a drive for the scanner to cause it to be driven along the line. A manual steering device may also be included for overriding the automatic system or for aiding the automatic system in choosing a desired line when going through an intersection.

BACKGROUND OF THE INVENTION

This invention relates to devices for automatically following a line on a given object, and deals more particularly with an optical line follower of the type wherein a scanning device having a scanning axis fixed relative thereto is moved relative to the object to move such scanning axis along said line.

Previously proposed optical line followers have often utilized movable mechanical elements in the line scanning system. These elements are limited in their speed of scanning movement and accordingly limit the maximum speed at which a line may be accurately followed. In the device of the present invention all mechanically moving parts of the scanning system may be eliminated and the maximum scanning rate may be accordingly greatly increased to allow a corresponding increase in the speed at which a line may be followed.

SUMMARY OF THE INVENTION

The invention resides in an optical line follower wherein a line to be followed is scanned with a circular scan by an optical scanner to produce an output pulse each time the scan crosses the line. The output pulses so produced are transmitted to a pulse phase comparator which accepts pulses occurring within a given portion of the circular scan path, referred to as the "aperture" of the comparator, and which produces an error signal representative of the deviation of the centers of the accepted pulses from the center of the aperture. The error signal shifts the phase of a variable requency oscillator, which in turn controls the angular position of the aperture along the scan path to slave the center of the aperture to the centers of the accepted pulses. The phase of the variable frequency oscillator output is then compared to the phase of a reference oscillator, by a phase detector, to produce two coordinate drive signals the resultant of which is a vector having a direction related to the direction of the line at the point of scanning. These two drive signals are respectively applied to two coordinate drive systems for driving the scanner and for accordingly causing it to move along the line. A manual steering device may also be included for overriding the automatic system, as for manually steering the follower to a line, or for aiding the automatic system in choosing a desired line when approaching an intersection.

2

A general object of the invention is to provide a line follower capable of following a line at a relatively high speed. In keeping with this object a further object is to provide a line follower wherein the scanning device is an optical-electronic unit utilizing no mechanically moving parts.

A further object of the invention is to provide an optical line follower having a relatively simple electrical control circuit for converting signals from a scanning device into drive signals for driving the scanning device along the line.

A still further object of the invention is to provide a line follower of the character described in the preceding paragraph which also includes a manual control for overriding or aiding the automatic control circuit.

Other objects and advantages of the invention will be apparent from the following description and the accompanying drawings.

BRIEF DESCRIPTION OF THE DRAWINGS

FIG. 3 and FIG. 4 are representations of the waveforms existing at various points in the system of FIG. 2 when the scanning device is properly centered on a line.

FIG. 5 is a set of waveforms similar to that of FIG. 4, but showing the condition of the waveforms when the scanning device is displaced slightly from centered relationship with the line.

FIG. 7 is a schematic block diagram showing a manual steering device which may be added to the line follower of FIG. 2.

DESCRIPTION OF THE PREFERRED EMBODIMENTS

Figure 1:
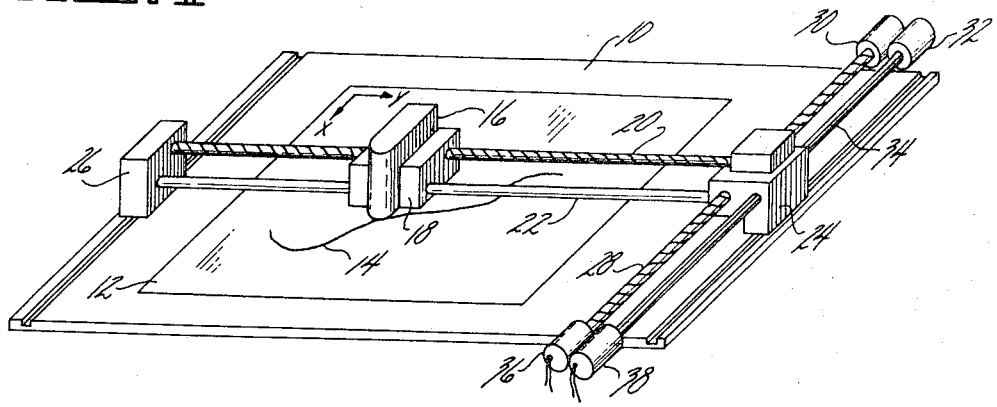
FIG. 1 is a somewhat schematic perspective view of a digitizer equipped with an optical scanner comprising part of a line follower embodying the present invention.

Turning now to the drawings, FIG. 1 shows, by way of example, a typical application of a line follower embodying the present invention. In this application the follower is used as part of a digitizer for automatically digitizing lines existing on chart sheets, patterns, photographs or similar items. The digitizer includes a table 10 for supporting an object, such as a sheet of paper 12, containing a line 14 to be digitized. Supported above the table 10 for movement in a plane generally parallel thereto is an optical scanning device 16 forming part of the line follower of the present invention. The scanning device 16 is moved in one coordinate direction, referred to as the Y axis, relative to the table 10 by a drive system including a carriage 18 upon which the scanning device is mounted, a lead screw 20 and a guide bar 22. The scanning device is also movable in a second coordinate direction, referred to as the X axis, relative to the table 10 by means of a second drive system comprising carriages 24 and 26 and a lead screw 28. The carriages 24 and 26 are supported by suitable guides or ways for movement in the X direction of FIG. 1 and are driven in such movement by the lead screw 28 and a suitable drive motor 30. The carriage 18 is driven in its movement in the Y direction of FIG. 1 by the lead screw 20 which is in turn driven by a suitable drive motor 32 connected with the lead screw 20 through a spline shaft 34 by suitable gearing in the carriage 24. The angular positions by the lead screw 28 and the spline shaft 34 are representative of the position of the carriage 18 and scanning device 16 relative to the table 10, and shaft encoders 36 and 38 are respectively connected with the lead screw 28 and spline shaft 34 to produce position signals transmitted to an associated computer or the like for completing the digitizing process.

Except for the scanning device 16, the device shown in FIG. 1 may be and X–Y plotter generally similar the one shown in Pat. No. 3,293,651 to which reference may be made for further details of construction. When an X–Y plotter is used for supporting and moving the scanning device the scanning device replaces the print head, pen or other graphic output device normally carrier by the carriage 18. The particular mean for supporting and moving the scanning device 16, however, by itself forms no part of the present invention and it is intended that any suitable support and driving mechanism may be used. It is also to be understood that the digitizer of FIG. 1 has been shown for illustrative purposes only and that there is no intention to limit the invention to such use. Instead, the line follower may also be used as a pattern tracer for controlling the operation of a machine tool or may be used for any other purpose to which line followers are conventionally put.

Figure 2:
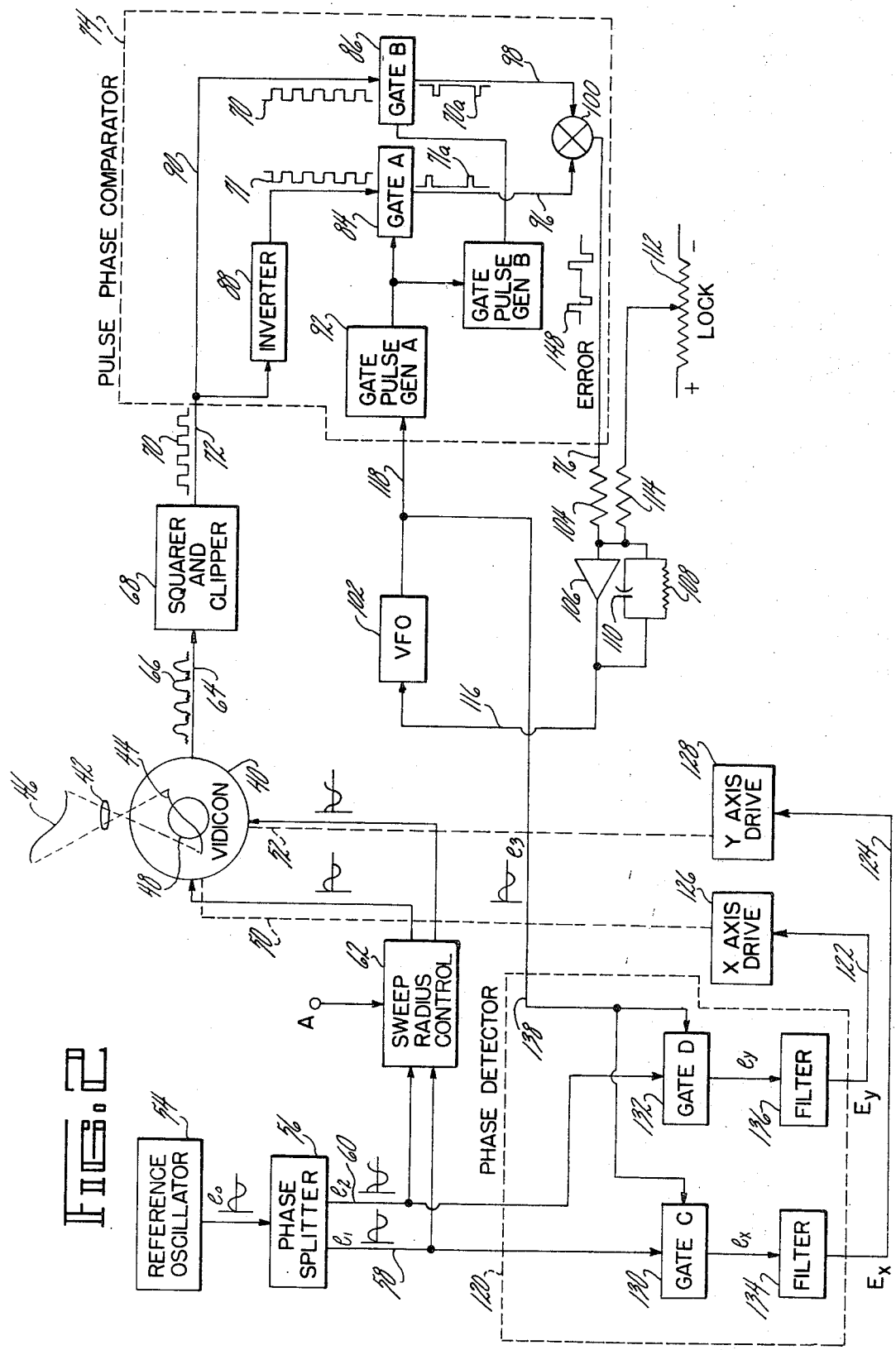
FIG. 2 is a schematic block diagram of a line follower embodying the present invention and utilizing the optical scanner of FIG. 1.

FIG. 2 is a schematic block diagram illustration of a line follower embodying this invention. Considering first the scanning device, this device is one which scans the line to be followed with a circular scan, having a diameter greater than the width of the line, and which produces an output pulse each time the scan crosses the line. In the FIG. 2 system the scanning device includes a television camera tube, preferably a vidicon tube 40, and an optical system, represented by the lens 42, for producing an image 44 of the actual line 46 at the tube. The circle 48 represents the circular path of the scanning beam of the vidicon tube 40, and as will be more evident from FIG. 6 the size of the scanning beam and diameter of the circular scan path are such that during movement of the beam through one part of its scan path, during a line following operation, it is located in its entirety on one side of the line being followed and during movement through another part of its scan path is located on the other side of the line being followed. Therefore, the scanning beam moves, in its entirety, across the line being followed twice during each complete traverse of the scan path and causes the tube 40 to produce two time spaced and discrete signals representative of said two line crossings. In comparing FIG. 2 with FIG. 1 the vidicon tube 40 is part of the scanning device 16 and in FIG. 2 the two drive systems for moving the scanning device relative to the line 46 are represented in part by the broken lines 50 and 52.

The means for causing the scanning beam of the vidicon tube 40 to move in a circular scan path comprises a reference oscillator 54 and an associated phase splitter. The reference oscillator 54 produces an alternating output signal which is converted by the phase splitter 56 into two alternating reference signals, $e_1$ and $e_2$, appearing on lines 58 and 60 respectively which are 90° out of phase with one another. These two signals are transmitted to the deflection coils (not shown) of the vidicon tube through a sweep radius control circuit 62 to produce the circular movement of the scanning beam. The sweep radius control circuit 62 controls the amplitude of the signals transmitted to the vidicon tube and thereby controls the radius of the scanning circle 48. The circuit 62 may in turn be adjusted to adjust the radius of the scanning circle, by a suitable input applied thereto at the point A. This input may be provided by a simple manually controlled element or may be a signal provided by an associated computer or other controller.

The output pulses produced by the vidicon 40 appear on the output line 64, and a series of such pulses are shown for example at 66. Each time the scanning beam of the vidicon tube crosses the image 44 of the line one output pulse is produced, and accordingly during each revolution of the scanning beam two such pulses are produced. The pulses on the line 64 are transmitted to a squarer and clipper circuit 68 which clips off the base of the pulses to eliminate noise and which also squares the tops of the pulses to produce shaped pulses such as shown at 70 on the output line 72. The use of a squaring and clipping circuit such as the circuit 68 is not however always essential and in many instances this circuit may be eliminated and the unshaped pulses 66 used directly in place of the shaped pulses 70.

In either event the output pulses from the vidicon tube 40, whether these be unshaped pulses such as the pulses 66 or shaped pulses such as the pulses 70, are transmitted to a pulse phase comparator 74. This comparator in effect operates to accept pulses only throughout a given sensing time "aperture" corresponding to a given angular portion of the circular scan path 48. Pulses which do occur throughout the sensing time aperture are accepted by the pulse phase comparator and the centers of these pulses are compared with the center of the sensing time aperture and an error signal, appearing on the line 76 and related to the displacement of the centers of the pulses from the center of the sensing time aperture, is produced.

Figure 6:
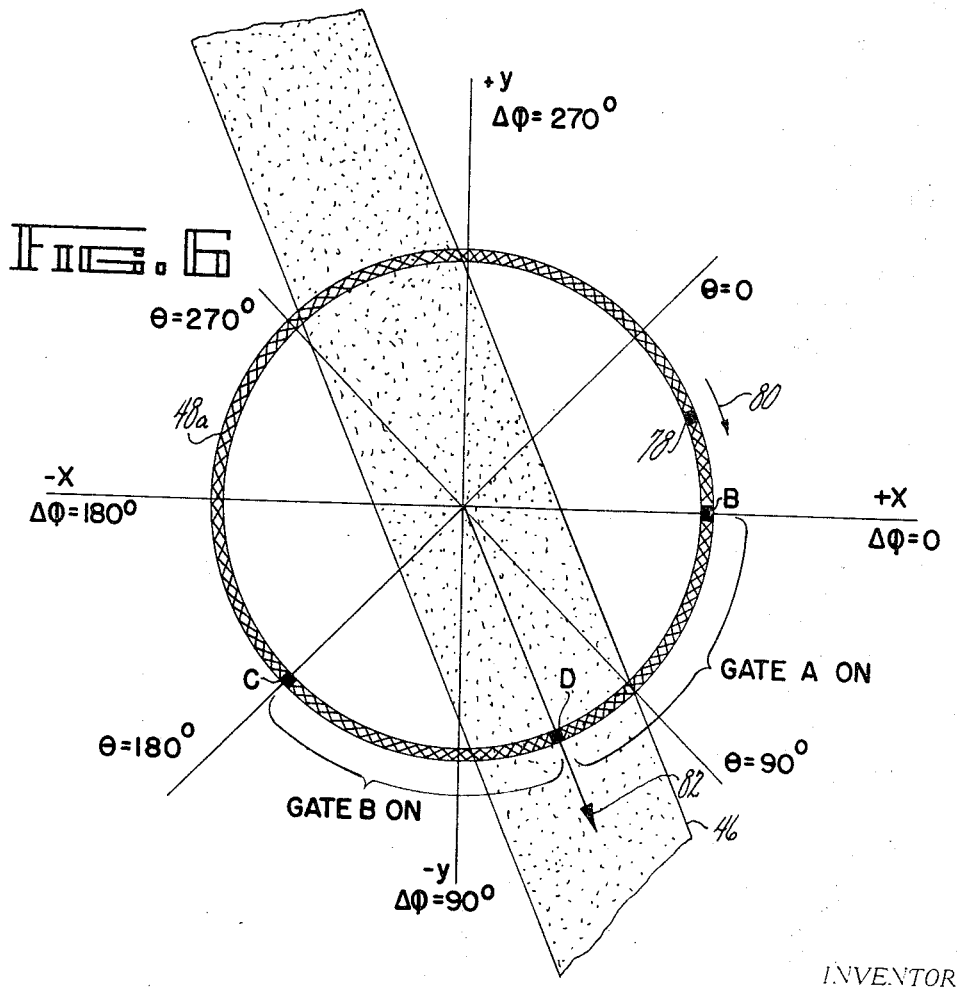
FIG. 6 is a diagram showing the scan path of the line follower of FIG. 2 relative to the line being followed.

The operation of the pulse phase comparator 74 and the other remaining components of the line follower of FIG. 2 may perhaps be best understood by first referring to FIG. 6 which shows, in greatly enlarged scale, the manner in which a line is scanned by the scanning device. In this figure the actual line being scanned is again shown at 46 and the scan path is shown at 48a, this path 48a being circular path 48 of the vidicon scanning beam as reflected by the optical system, represented by the lens 42, to the line 46. In FIG. 6 the scan, represented by the point 78 and consisting of the scanning beam of the vidicon tube as reflected to the line 46, moves in the direction of the arrow 80 along the scan path 48a. The points B and C represent the limits of the sensing time aperture provided by the pulse phase comparator 74, and the point D represents the center of this aperture. The aperture is therefore seen to be an interval of time occurring during each revolution of the scan 78 and during which interval the pulse phase comparator is conditioned to receive pulses produced by the scan.

As is well known, the vidicon tube produces an output related to the relative darkness and brightness of the object being scanned. Therefore, when the scan 78 is off of the line 46 one level of output is produced and when the scan is on the line 46 another level of output is produced, the result being that a pulse is produced in the output each time the scan 78 crosses the line 46. It will also be noted from FIG. 6 that during each revolution of the scan 78 it crosses the line 46 twice and therefore produces two pulses in the output of the vidicon. Only one of these pulses occurs however within the sensing time aperture defined by the points B and C. The arrow 82 in FIG. 6 represents the direction of movement of the scanning device 16 and of the scan path 48a and when the line follower is properly operating this direction of movement is exactly parallel to the line 46. The pulses produced as the scan 78 passes over the line 46 at the advancing part of the scan path may be referred to as leading pulses and the pulses produced by the scan 78 as it passes over the line 46 at the trailing part of the scan path 48 may be referred to as trailing pulses. Only the leading pulses are used for controlling the movement of the line follower and it is the pulse phase comparator 74 which eliminates or blanks out the trailing pulses by accepting only the leading pulses.

The pulse phase comparator of FIG. 2 may take various different forms but, as illustrated in FIG. 2, comprises two gate circuits 84 and 86 referred to respectively as gate A and gate B. Pulses from the squaring and clipping circuit 68 are supplied to gate A through an inverter 88 and are also fed directly to the line 90. The gate A is controlled by a gate pulse generator 92 which produces a pulse for gating or turning on the gate A. The duration of this gate pulse constitutes half of the duration of the sensing time aperture and is equivalent to the duration of time required for the scan 78 to move between the points B and D of FIG. 6. The gate B is in turn controlled by another gate pulse generator 94 which produces a gate pulse for gating or turning on the gate B and which corresponds to the second half of the sensing time aperture. The duration of this gate pulse is equivalent to the amount of time required for the scan 78 to move from the point D to the point C in FIG. 6. The gate pulse generator 94 is controlled or triggered by the trailing edge of the gate pulse produced by the gate pulse generator 92 so that at the same instant the gate A is turned off the gate B is turned on. The result of the foregoing, as shown in FIG. 6 is that the first half of the sensing time aperture is determined by the on period of gate A and the second half of the time sensing aperture is determined by the on period of gate B.

From FIG. 6 and FIG. 2 it will be apparent that when the sensing time aperture of the pulse phase comparator 74 is properly centered relative to the line 46, as shown in FIG. 6 each leading pulse produced by the scan 78 will have half of its duration included within the on period of gate A and other half of its duration located within the on period of gate B. Accordingly the outputs of gates A and B appearing on lines 96 and 98 respectively, are pulses derived from the leading pulses supplied to these gates but of durations equal to only half the durations of such pulses. The pulses appearing on the lines 96 and 98 are summed in a summing network 100 to produce an error signal appearing on the line 76. When the pulses on the line 96 and 98 are of equal duration they exactly cancel one another in the summing network 100 so that an error signal of zero average valve is produced. Should, however, the sensing aperture of FIG. 6 not be properly centered on the line 46 one of the other sets of pulses appearing on the lines 96 and 98 would be of longer duration then those of the other set with the result that an error signal having a positive or negative average valve produced by the summing network 100.

As described hereinafter the error signal from the summing network 100 is used to control the angular position of the sensing time aperture about the scan path 48a so that the center of the aperture is slaved to the center of the line, and the position of the aperture is in turn used to control the direction in which the scanning device is driven so that the axis of the scan circle is automatically moved toward the center of the aperture, as indicated by the arrow 82 of FIG. 6.

The means for controlling the timing or position of the sensing time aperture of the pulse phase comparator 74 comprises a variable frequency oscillator 102 to which the error signal appearing on the line 76 is supplied through a suitable loop closing circuit consisting of a resistor 104, an operational amplifier 106 and an amplifier feed back circuit consisting of a resistor 108 and capacitor 110, the complete circuit being an operational integrator the output of which through the action of the resistor 108 is returned to a predetermined reference level when no error signal or a zero average value error signal appears on the line 76. Also included in this circuit is a potentiometer 112 having the opposite ends of its winding connected respectively to sources of positive and negative voltage and having its wiper connected to the input of the operational amplifier 106 through a resistor 114. The variable frequency oscillator 102 is one having substantially the same basic frequency as the reference oscillator 54 but adjustable to either side of such basic frequency by the voltage signal appearing on its input line 116. For example, the reference oscillator 54 may be one having a fixed output frequency of ten kilocycles and the variable frequency oscillator may be one having a frequency of ten kilocycles plus or minus one kilocycle. That is, the frequency of the variable frequency oscillator may be varied between 9 kilocycles and 11 kilocycles by varying the voltage applied thereto through the line 116. The potentiometer 112 is a means for locking the basic frequency of the variable frequency oscillator to the frequency of the reference oscillator 54, by adjusting the reference level output of the amplifier 106, so that when no error signals appear on the line 76 the variable frequency oscillator has the same frequency as the reference oscillator.

The output from the variable frequency oscillator which appears on the line 118 triggers the gate pulse generator 92 each time the output passes a given point in each of its cycles. Accordingly, when the frequency of the variable frequency oscillator 102 is the same as the frequency of the reference oscillator 54 the gate pulse generator 92 is triggered at the same point in each revolution of the scan and the sensing time aperture remains stationary relative to the scan path. This condition prevails for so long as no unsymmetrical error signal appears on the line 76. When an unsymmetrical error signal does appear, however, the voltage appearing on the line 116 changes and in turn changes the frequency of the variable frequency oscillator 102. As the signal on the line 118 changes in frequency the triggering point for the gate pulse generator 92 changes in phase relative to the reference oscillator 54, and the sensing time aperture is accordingly shifted angularly relative to the circular scan path. This shifting continues until the average value of the error signal appearing on the line 76 becomes zero, indicating that the sensing time aperture is again centered on the line. The zero average value error signal causes the voltage on the line 116 to return to the predetermined reference value dictated by the potentiometer 112 and thereby brings the variable frequency oscillator back to the same frequency as the reference oscillator. The phase of the output on the line 118 however remains shifted relative to its original condition and accordingly the sensing time aperture remains at a new position relative to the scan path.

From the foregoing it will be understood that the angular position of the sensing time aperture relative to the scan path is dependent on the phase difference between the reference oscillator 54 and the variable frequency oscillator 102. Furthermore, since the position of the sensing time aperture is indicative of the direction in which the scanning device should be moved to follow the line 46 the phase difference between the two oscillators may be used for producing drive signals for mechanically driving the scanning device. The phase difference is expressed in degrees, has a range of 360°, and therefore can be considered as a vector direction. The drive desired is therefore one whereby the scanning device is driven at a velocity the vector direction of which is related to the phase difference.

As shown in FIG. 2, the means provided for driving the scanning device in response to the phase difference between the two oscillators consists of a phase detector 120 having as inputs thereto the two signals appearing on the lines 58 and 60, these signals being signals of the same fixed frequency as the reference oscillator 54 and 90° out of phase with one another. These two signals are compared in phase with the phase of the output of the variable frequency oscillator 102 to produce two signals appearing on the output lines 122 and 124. The signal appearing on the line 122 is a direct current signal having a magnitude related to the phase difference between the signal on the line 60 and the output of the variable frequency oscillator, and the signal appearing on the line 124 is similarly a direct current signal having a magnitude related to the phase difference between the signal appearing on the line 58 and the output of the variable frequency oscillator.

The signal of the line 122 is transmitted to the X axis drive 126 for the scanning device and the signal appearing on the line 124 is transmitted to the Y axis drive 128 for the scanning device. The drive 126 is one wherein the scanning device is moved along the X axis at a speed directly related to the magnitude of its input signal and the Y axis drive is similarly one which operates to drive the scanning device at a speed along the Y axis related to the magnitude of its input signal. Accordingly, as will be more evident hereinafter, when the two signals on the lines 122 and 124 are applied to the drives 126 and 128 the resulting velocity of the scanning devices has a direction related to the direction of the resultant of the two signals and in turn related to the phase difference between the two oscillators and the position of the time sensing aperture about the scan path.

The phase detector 120 may take various different forms and in FIG. 2 is shown to consist merely of two gates 130 and 132, referred to respectively as gate C and gate D, and two respectively associated filter circuits 134 and 136. The two gates 130 and 132 are gated simultaneously by the output from the variable frequency oscillator 102 supplied thereto through the line 138. The gates are designed so as to be turned on during one half of each cycle of the variable frequency output and to be turned off for the other half of each such cycle. The outputs from the gates 130 and 132 are therefore half cycle portions of the signals appearing on the lines 58 and 60, respectively, with the exact portions passing through or sampled by the gates being dependent on the phase of the variable frequency oscillator relative to the reference oscillator. The outputs of the gates 130, 132 pass through the associated filters 134 and 136 which convert the signals into filtered or direct current signals.

Further understanding of the line follower as shown in FIG. 2 may be had by reference to FIGS. 3, 4 and 5 which show the waveforms existing at various parts of the system. FIGS. 3 and 4 show the waveforms existing when the sensing time aperture is properly centered on the line being scanned, as in FIG. 6. Referring to these latter two figures, and first considering FIG. 3, the upper curve 140 in FIG. 3 shows the output of the reference oscillator 54 as appearing on the line 58. The pulses 70, 70 are the pulses from the vidicon as shaped by the squarer and clipper 68 and the pulses 71, 71 are the same pulses as inverted by the inverter 88 and supplied to the gate A. The curve 142 represents the output of the variable frequency oscillator which is shown to be approximately 67½° of phase with the reference oscillator. The pulses 144, 144 indicate the gating of the gate A of the pulse phase comparator, and it will be noted that this gate is turned on or triggered at the instant the output of the variable frequency oscillator goes from negative to positive voltage. The pulses 146, 146 in turn illustrate the gating of the gate B, and it will be noted that this gate is turned on or triggered at the same instant that the gate A is turned off. The pulses 70a, 70a represent the portions of the pulses 70, 70 passing through the gate A and the pulses 71a, 71a represent the portions of the pulses 71, 71 passing through the gate B. The on periods of the gates A and B determine the duration of the sensing time aperture and, as shown in FIG. 3, the center of this aperture, occurring at the instant gate A is turned off and gate B turned on, is centered relative to the pulses 70 and 71. Therefore the pulses 70a and 71a are of equal size but of opposite sign so as to form a symmetrical error signal, as shown at 148, 148 in FIG. 3, at the output of the summing network 100 of FIG. 2. The average value of this error signal is zero and therefore no shifting of the sensing time aperture takes place.

Turning to FIG. 4 the upper curve 140 again represents the output of the reference oscillator as appearing on the line 58 of FIG. 2, and the curve 150 represents the reference oscillator signal appearing on the line 60 which signal is 90° out of phase with the signal 140. The curve 142 again represents the output of the variable oscillator. The pulses 152, 152 show the gating of the gates C and D and from this it will be noted that both of these gates are turned on during each positive half cycle of the variable frequency oscillator and are turned off during each corresponding negative half cycle. The curves 154, 154 represent the output of the gate C, derived from the signal 140, and the broken line 156 represents the filtered value of this signal as applied to the X axis drive. Similarly, the curves 158, 158 represent the output of the gate D, derived from the signal 150, and the broken line 160 represents the filtered value of this signal as applied to the Y axis drive.

From FIG. 4 it can also be noted that as the phase difference between the variable frequency oscillator and the reference oscillator changes different portions of the two reference oscillator signals 140 and 150 will be sampled by the gates C and D to produce X axis and Y axis drive signals which vary between maximum positive values and maximum negative values depending on the phase difference. For example, it can be observed that when the phase difference $\Delta \phi$ is zero the X axis drive signal 156 will have a maximum positive value and the Y axis drive signal 160 will be zero, thereby causing the scanning device to be driven in the positive X direction. Likewise, it can be seen that when the phase difference is 90° the X axis drive signal 156 will have a zero value and the Y axis drive signal 160 will have a maximum negative value to cause the scanning device to be driven in the minus Y direction. This relationship between the direction of drive and the phase difference is further shown in FIG. 6 wherein the horizontal and vertical axes passing through the scan center of the scan path are labeled to show the phase angles corresponding to different directions of drive. The arrow 82 of FIG. 6 shows the particular direction of drive achieved by the conditions illustrated in FIG. 4.

FIG. 5 is similar to FIG. 3 but shows the waveforms existing immediately after the center of the sensing time aperture is shifted from the center of the scan line as might result, for example, in the line changing direction as the scan is moved therealong. As a result of this change in direction of the line the vidicon pulses are displaced slightly from the positions occupied in FIG. 3 and as a result of this shifting the pulses 70a, 70a passing through the gate A become shorter in duration and the pulses 71a, 71a passing through the gate B become larger in duration so as to produce an unsymmetrical error signal 148. This unsymmetrical error signal therefore produces an output from the operational amplifier 106 which changes the frequency of the variable frequency oscillator 102 and accordingly shifts the phase of this oscillator relative to the reference oscillator to shift the sensing time aperture to return its center toward centered position with the line.

The line follower shown in FIG. 2 may also include a manual steering device for overriding or aiding the automatic functioning of the system to enable an operator to exercise some authority over the movement of the scanning device. Such a manual steering device is shown in FIG. 7. This figure shows only a part of the line follower, but it is to be understood that the parts not shown are or may be identical with those of FIG. 2.

Referring to FIG. 7, the manual steering device, indicated generally at 162, includes a variable phase shifter 164 having as an input thereto the output of the variable frequency oscillator 102 and controlled by a manually manipulatable element such as rotatable knob 166 fixed to a shaft 168. The operation of the shifter is such that as the shaft 168 is turned through 360° its output signal is similarly shifted in phase by 360° relative to its input signal. The output of the phase shifter is transmitted to a phase detector 170 which has as another input thereto the reference oscillator output signal appearing on the line 60. The phase detector 160 compares the output of the variable phase shifter with the reference oscillator signal and produces an output signal on the line 172 related to the difference in phase between such two signals. Therefore, whenever the output of the phase shifter is in phase with the reference oscillator signal supplied to the phase detector 170 no error signal is produced. For every different phase angle difference between the reference oscillator and the variable frequency oscillator the shaft 168 has a diffrent position at which no error signal is produced, and the knob 166 is preferably so shaped, or provided with a pointer, and so fixed on the shaft 168 as to point in the direction of movement of the scanning device dictated by the position of the shaft 168. That is, in the illustration of FIG. 7, for example, the knob 166 is pointing generally to the right and if the knob is fixed at the proper position on the shaft the scanning device will also be moving in this same direction, the output of the phase detector 170 being zero so as to have no effect on the movement of the scanning device. The line 172 is connected to the input of the operational amplifier 106 through a switch 174 and a resistor 176 so that when the switch 174 is closed the error signal produced by the phase detector 170 is added to the error signal appearing on the line 76 to produce a modified error signal for controlling the frequency of the variable frequency oscillator 102.

Also included in the line 172 is a series of resistors 178, 180 and 182 and a selector switch 184 movable to different positions to selectively introduce more or less resistance into the line 172 to control the amount of authority exercised by the manual steering error signal from the phase detector 170. For example, when the switch 184 is moved to the $a$ terminal all three of the resistors 178, 180 and 182 are by-passed so that the manual steering error signal supplied to the operational amplifier 106 is relatively large and in effect completely overrides the automatic error signal appearing on the line 76 so that by turning the knob 166 the operator may exercise relatively complete control over the movement of the scanning device when, for example, steering the scanning device onto a desired line at the beginning of a line tracing operation. When the switch is moved to the other three terminals $b$, $c$ or $d$ the manual steering error signal has lesser authority over the automatic steering signal appearing on the line 76, and the switch 184 may be set to one of these terminals when it is desired to use the knob 166 to aid the scanning device in choosing a proper line when going through an intersection. One of the features of the illustrated line follower is that when crossing a symmetrical intersection the error signal appearing on the line 76 will remain symmetrical so that the scanning device tends to continue in its same direction of travel and moves directly through the intersection. At unsymmetrical intersections, however, some ambiguity may sometimes arise and the scanning device may, if left completely to its own decision, choose to follow an undesired one of the lines forming the intersection. This can be overcome by the operator pointing the knob 166 in the direction of the desired line. And if the scanning device tends to move away from the desired line a manual steering error signal will be produced tending to maintain the device on the desired line.

The variable phase shifter 164 may be used by itself as a steering device, but preferably the steering mechanism also includes a means for automatically moving the shaft 168 and knob 166 of the phase shifter to the position corresponding to the direction of movement of the scanning device and for resisting movement of the shaft and knob away from such position. As shown in FIG. 7, this means includes a torquer 186, which may be a servo motor, having an output shaft 188 coupled with the shaft 168 through gears 190 and 192 or other suitable drive means. The torquer 186 is connected with the error signal line 172 through a switch 194, which may be closed to bring it into play or opened to defeat its function. The operation of the torquer 186 is such that when an error signal appears on the line 172 it energizes the torquer 186 to rotate the shaft 168 to null the output on the line 172. Therefore, it will be understood that as the phase of the input to the phase shifter 164 changes the error signal on the line 172 also changes thereby energizing the torquer 186 to cause it to move the shaft 168 to reduce to zero the error signal, and thereby the knob 166 and shaft 168 are automatically rotated in accordance with changes in direction of the scanning device. At the same time the torquer also exerts a mechanical bias on the shaft 168 tending to resist movement of the knob 166 away from its nulled condition, that is away from correspondence with the direction of movement of the scanning device, and therefore a "feel" is given to the knob enabling the operator to control better the manual steering.

While this invention has been described above in connection with particular embodiments thereof, it will be understood that it is capable of further modification, and it is intended to cover any variations, uses, and adaptations as fall within the scope of the invention as defined by the appended claims.

What is claimed is:

1. A line follower comprising a scanning means including an electronic tube mounted for movement in a plane generally parallel to the plane of a line to be followed, said electronic tube having a face and means for forming an electron beam directed onto said face, means for causing said electron beam to move over said face in a circular scan path having a center fixed relative to said face, optical means for superimposing said circular scan path and a portion of the line to be followed, said electron beam and its said circular scan path being of such size at the place of superimposition that during a line following operation said beam is located in its entirety on one side of said line during its movement along a part of said circular scan path and on the other side of said line during its movement along another part of said circular scan path, means for producing an output pulse each time said electron beam crosses said line at the place of superimposition, and means for driving said electronic tube in said plane of movement at a velocity the vector direction of which is related to the angular position at which at least some of said output pulses occur along said circular scan path.

2. A line follower as defined in claim 1 further characterized by said electronic tube comprising a television camera tube which camera tube also includes said pulse producing means.

3. A line follower as defined in claim 2 further characterized by said camera tube being a vidicon tube.

4. A line follower as defined in claim 1 further characterized by said optical means being one which serves to project a real image of said portion of the line to be followed onto said face of said electronic tube so as to superimpose said circular scan path and said portion of said line on said face.

5. A line follower comprising a scanning means including an electronic tube mounted for movement in a plane generally parallel to the plane of a line to be followed, said electronic tube having a face and means for forming an electron beam directed onto said face, means for causing said electron beam to move over said face in a circular scan path having a center fixed relative to said face, optical means for superimposing said circular scan and a portion of the line to be followed, means for producing an output pulse each time said electron beam crosses said line at the place of superimposition, and means for driving said electronic tube in said plane of movement at a velocity the vector direction of which is related to the angular position at which at least some of said output pulses occur along said circular scan path, said means for driving said electronic tube including a sensing time aperture means for accepting pulses from said pulse producing means during only a sensing time aperture portion of each 360° of movement of said scan, and means for driving said electronic tube in said plane of movement at a velocity the vector direction of which is related to the angular position at which pulses accepted by said time aperture means occur along said circular scan path.

11

6. A line follower as defined in claim 5 further characterized by means for automatically shifting said sensing time aperture portion about said circular scan path to maintain the center of said aperture portion generally coincident with the center of pulses produced by said pulse producing means during said sensing time aperture portion.

7. A line follower comprising a scanning means including an electronic tube mounted for movement in a plane generally parallel to the plane of a line to be followed, said electronic tube having a face and means for forming an electron beam directed onto said face, means including a reference oscillator for causing said beam of said electronic tube to move over said face in a circular scan path having a center fixed relative to said face, optical means for superimposing said circular scan path and a portion of the line to be followed, means for producing an output pulse each time said electron beam crosses said line at the place of superimposition, a pulse phase comparator connected to the output of said pulse producing means and having a sensing time aperture representative of a given angular portion of said circular scan path, said pulse phase comparator being operable to produce an error signal related to the time displacement of the centers of pulses produced by said pulse producing means during said time aperture from the center of said sensing time aperture, a variable frequency oscillator associated with said pulse phase comparator and the phase of which variable frequency oscillator relative to said reference oscillator determines the angular position of said sensing time aperture about said circular scan path, means responsive to said error signal for varying the frequency of said variable frequency oscillator to change its phase relative to said reference oscillator and to thereby shift said sensing time aperture in such direction as to reduce said error signal and slave the center of said sensing time aperture to the centers of the pulses produced by said pulse producing means during said sensing time aperture, and means for driving said electronic tube in said plane of movement at a velocity the vector direction of which is related to the phase difference between said reference oscillator and said variable frequency oscillator.

8. A line follower as defined in claim 7 further characterized by said means for driving said electronic tube in said plane of movement at a velocity the vector direction of which is related to the phase difference between said reference oscillator and said variable frequency oscillator comprising means for producing two alternating signals fixed in phase to said reference oscillator and 90° out of phase with one another, a phase detector for comparing the phase of each of said two alternating reference signals to the phase of said variable frequency oscillator and for producing two direct current signals each having a magnitude related to the phase difference between a respective one of said two alternating signals and said variable frequency oscillator, a first drive system for driving said electronic tube in one coordinate direction in said plane movement at a speed related to the magnitude of an applied input signal, a second drive system for driving said electronic tube in a second coordinate direction in said plane of movement at a speed related to the magnitude of an applied input signal, and means for transmitting one of said two direct current signals to said first drive system and for transmitting the other of said two direct current signals to said second drive system.

9. A line follower as defined in claim 7 further characterized by said pulse phase comparator comprising two gate circuits each connected with the output of said pulse producing means, a first gate pulse generator for producing a gate pulse for gating the first of said two gate circuits, a second gate pulse generator for producing a gate pulse for gating the second of said two gate circuits, means connecting said first gate pulse generator to said variable frequency oscillator so as to be triggered and produce a gate pulse each time the output of said variable frequency oscillator passes a given point in each of its cycles, and

12 means for connecting said second gate pulse generator to the output of said first gate pulse generator so as to be triggered and produce a gate pulse at the end of each gate pulse produced by said first gate pulse generator, and means for comparing the output of said two gate circuits and for producing an error signal related to the result of the comparison.

10. A line follower as defined in claim 7 further characterized by said phase detector including two gate circuits one having as an input thereto one of said alternating reference signals and the other having as an input thereto the other of said alternating reference signals, and means for turning said two gate circuits on for identical periods which periods begin at a given point in each cycle of said variable frequency oscillator and are of shorter duration than each of its cycles.

11. A line follower as defined in claim further characterized by a manual steering device including a manually manipulatable element movable to different positions corresponding to different directions of movement of said electronic tube, means for comparing the direction of movement of said electronic tube commanded by the position of said manually manipulatable element with its actual direction of movement and for producing a manual steering error signal related to the difference therebetween, and means for summing said manual steering error signal with said first mentioned error signal to produce a modified error signal to which said variable frequency oscillator is responsive.

12. A line follower as defined in claim 7 further characterized by a manual steering device including a manually manipulatable element movable to different positions corresponding to different directions of movement of said electronic tube, a variable phase shifter controlled by said manually manipulatable element and having the output of said variable frequency oscillator as an input thereto so that its output is a signal shifted in phase from said variable frequency oscillator by a phase difference dependent on the position of said manually manipulatable element, a phase detector for comparing the phase of the output of said variable phase shifter with the phase of said reference oscillator to produce a manual steering error signal related to the difference therebetween, means for summing said manual steering error signal with said first mentioned error signal to produce a modified error signal to which said variable frequency oscillator is responsive, and a servo motor responsive to said manual steering error signal for driving said manually manipulatable element in such a direction as to reduce said manual steering error signal and for producing a mechanical bias on said manually manipulatable element resisting its movement from the position at which said manual steering error signal is nulled.

13. A line follower comprising a scanning means including a television camera tube mounted for movement in a plane generally parallel to the plane of a line to be followed, said television camera tube having a face and means for forming an electron beam directed onto said face, means including a reference oscillator for producing two alternating reference signals which are 90° out of phase with one another and which are transmitted to said camera tube to cause its beam to move over said face in a circular scan path having a center fixed relative to said face, optical means for producing an image of the line to be followed on the face of said camera tube, said camera tube including means for producing an output pulse each time said electron beam crosses the image of said line on said face, a pulse phase comparator connected with the output of said camera tube and having a sensing time aperture representative of a given angular portion of the circular path of said beam and operable to produce an error signal related to the time displacement of the centers of pulses produced by said camera tube during said time aperture from the center of said time aperture, a variable frequency oscillator associated with said pulse phase comparator and the phase of which variable frequency oscillator relative to said reference oscillator determines the angular position of said sensing time aperture about said circular path of said beam, means responsive to said error signal for varying the frequency of said variable oscillator to change its phase relative to said reference oscillator and to accordingly shift said sensing time aperture in such direction as to reduce said error signal, a phase detector for comparing the phase of each of said two alternating reference signals to the phase of said variable frequency oscillator and for producing two direct current signals each having a magnitude related to the phase difference between a respective one of said two alternating reference signals and said variabe frequency oscillator, a first drive system for driving said camera tube in one coordinate direction in said plane of movement at a speed related to the magnitude of an applied input signal, a second drive system for driving said camera tube in a second coordinate direction in said plane of movement at a speed related to an applied input signal, and means transmitting one of said two direct current signals to said first drive system and for transmitting the other of said two direct current signals to said second drive system.

14. A line follower as defined in claim 12 further characterized by said television camera tube being a vidicon tube.

15. A line follower as defined in claim 13 further characterized by a manual steering device including a manually manipulatable element movable to different positions corresponding to different directions of movement of said camera tube in said plane of movement, means for comparing the direction of movement of said camera tube commanded by the position of said manually manipulatable element with its actual direction of movement and for producing a manual steering error signal related to the difference therebetween, and means for summing said manual steering error signal with said first mentioned error signal to produce a modified error signal to which said variable frequency oscillator is responsive.

16. A line follower as defined in claim 13 further characterized by a manual steering device including a manually manipulatable element movable to different positions corresponding to different directions of movement of said camera tube, a variable phase shifter controlled by said manually manipulatable element and having the output of said variable frequency oscillator as an input thereto so that its output is a signal shifted in phase from said variable frequency oscillator by a phase difference dependent on the position of said manually manipulatable element, a phase detector for comparing the phase of the output of said variable phase shifter with the phase of said reference oscillator to produce a manual steering error signal related to the difference therebetween, means for summing said manual steering error signal with said first mentioned error signal to produce a modified error signal to which said variable frequency oscillator is responsive, and a servo motor responsive to said manual steering error signal for driving said manually manipulatable element in such a direction as to reduce said manual steering error signal and for producing a mechanical bias on said manually manipulatable element resisting its movement from the position at which said manual steering error signal is nulled.

References Cited

UNITED STATES PATENTS

| 2,838,602 | 6/1958 | Sprick | 178—6.8 |
| 2,663,857 | 12/1953 | Holcomb | 250—202 |

FOREIGN PATENTS 890,887  11/1958  Great Britain.

ROBERT L. GRIFFIN, Primary Examiner

B. L. LEIBOWITZ, Assistant Examiner

PO-1050
(5/69)

UNITED STATES PATENT OFFICE
CERTIFICATE OF CORRECTION

Patent No. 3,529,084               Dated September 15, 1970

Inventor(s) Leonard G. Rich

It is certified that error appears in the above-identified patent and that said Letters Patent are hereby corrected as shown below:

Col. 1, line 57, "requency" should read --frequency--.
        Col. 3, line 9, "carrier" should read --carried--.
        Col. 3, line 10, "mean" should read --means--.

Col. 9, line 3, "diffrent" should read --different--.
        Col. 12, line 8, "claim 7" should read --claim 8--.
        Col. 12, line 17, following "claim" insert --7--.
        Col. 13, line 15, "variabe" should read --variable--.

SIGNED AND SEALED
JAN 12 1971

(SEAL)
Attest

Edward M. Fletcher, Jr.
Attesting Officer

WILLIAM E. SCHUYLER, JR.
Commissioner of Patents